(12) United States Patent
Kang

(10) Patent No.: US 9,032,479 B2
(45) Date of Patent: May 12, 2015

(54) METHOD, MOBILE TERMINAL AND SYSTEM FOR PROVIDING DIFFERENT AUTHENTICATION VALUES ACCORDING TO CONTACT METHOD OF MOBILE TERMINAL

(75) Inventor: Moon-Soon Kang, Seongnam-si (KR)

(73) Assignee: KT Corporation, Seongnam (KR)

( * ) Notice: Subject to any disclaimer, the term of this patent is extended or adjusted under 35 U.S.C. 154(b) by 26 days.

(21) Appl. No.: 13/441,669

(22) Filed: Apr. 6, 2012

(65) Prior Publication Data

US 2012/0260311 A1 Oct. 11, 2012

(30) Foreign Application Priority Data

Apr. 6, 2011 (KR) .................. 10-2011-0031873

(51) Int. Cl.
| | |
|---|---|
| *G06F 21/31* | (2013.01) |
| *G06F 3/0346* | (2013.01) |
| *H04B 5/00* | (2006.01) |
| *H04W 12/06* | (2009.01) |
| *H04L 29/08* | (2006.01) |
| *H04W 84/18* | (2009.01) |
| *H04L 29/06* | (2006.01) |

(52) U.S. Cl.
CPC .............. *G06F 21/31* (2013.01); *G06F 3/0346* (2013.01); *H04B 5/0031* (2013.01); *H04W 12/06* (2013.01); *H04W 84/18* (2013.01); *H04L 63/0492* (2013.01); *H04L 67/02* (2013.01)

(58) Field of Classification Search
CPC ................................ H04L 63/08; H04L 63/10
USPC ............................................ 726/2–4, 17, 21
See application file for complete search history.

(56) References Cited

U.S. PATENT DOCUMENTS

| | | | | |
|---|---|---|---|---|
| 2009/0249478 | A1* | 10/2009 | Rosener et al. | 726/19 |
| 2009/0320123 | A1* | 12/2009 | Yu et al. | 726/16 |
| 2010/0165076 | A1* | 7/2010 | Vau | 348/36 |
| 2011/0068165 | A1* | 3/2011 | Dabosville | 235/375 |
| 2011/0131537 | A1* | 6/2011 | Cho et al. | 715/863 |
| 2011/0145587 | A1* | 6/2011 | Park | 713/182 |

FOREIGN PATENT DOCUMENTS

| | | |
|---|---|---|
| KR | 10-2006-0088613 A | 8/2006 |
| KR | 10-2010-0060192 A | 6/2010 |
| KR | 10-2010-0104352 A | 9/2010 |

OTHER PUBLICATIONS

Communication from Korean Patent Office issued Sep. 25, 2014 in counterpart Korean Patent Application No. 10-2011-0031873.

* cited by examiner

*Primary Examiner* — Anthony Brown
(74) *Attorney, Agent, or Firm* — Sughrue Mion, PLLC

(57) ABSTRACT

System and method of authenticating a terminal. An authentication system which provides an authentication value specified by a tilt angle of a terminal, includes a terminal which measures the tilt angle, and a short-range communication reader which receives the tilt angle and terminal identification data from the terminal by using short-range communication and which generates the authentication value based on the tilt angle. The short-range communication reader authenticates the terminal based on the authentication value.

21 Claims, 8 Drawing Sheets

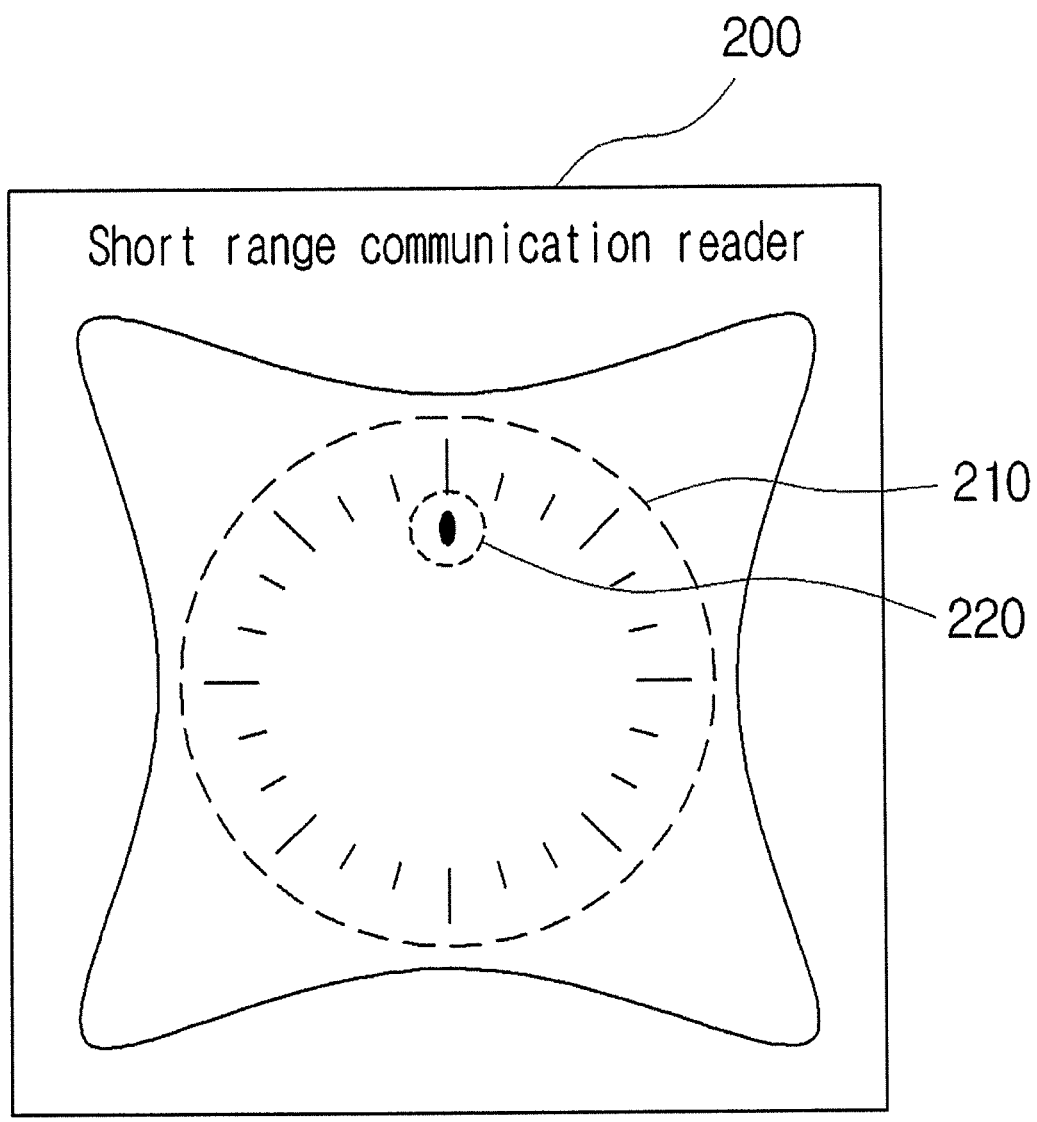

METHOD, MOBILE TERMINAL AND SYSTEM FOR PROVIDING DIFFERENT AUTHENTICATION VALUES ACCORDING TO CONTACT METHOD OF MOBILE TERMINAL

CROSS-REFERENCE TO RELATED APPLICATION(S)

This application claims the benefit of priority from Korean Patent Application No. 10-2011-0031873, filed on Apr. 6, 2011 in the Korean Intellectual Property Office, the disclosure of which is incorporated herein by reference in its entirety.

BACKGROUND

1. Field

Exemplary embodiments broadly relate to authentication of a terminal, and more particularly, to a system and a method for authenticating a terminal based on an authentication value corresponding to a tilted angle of the terminal approaching a short-range communication reader.

2. Description of the Related Art

Near field communication (NFC) is a type of short-range wireless communication technology. NFC enables two-way communication between devices that are within about 10 cm.

The related art security devices require inputting a password or scanning an access card in order to permit entry through a door or entry to other security devices. While the access card is widely used because of its convenience of not needing to press any buttons or memorize passwords, misuse of the access card by someone else is always possible in case the access card is lost. In order to prevent this mishap, the password can be utilized together with the access card, but this may be counterproductive as it requires memorizing the password.

Accordingly, there is a need in the art for a method and/or a system that can provide the necessary security when approaching a security device without requiring input of a password.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to one aspect of an exemplary embodiment, there is provided an authentication system of authenticating a terminal. The system includes: a short-range communication reader; and a terminal which measures a tilt angle as the terminal approaches a short-range communication reader. The short-range communication reader receives the measured tilt angle and terminal identification data from the terminal by using short-range communication and generates an authentication value based on the tilt angle. The short-range communication reader authenticates the terminal based on the generated authentication value.

The authentication system may further have an authentication server which receives from the short-range communication reader the tilt angle and the terminal identification data and which authenticates the terminal based on the received tilt angle and the received terminal identification data.

The terminal may measure the tilt angle and the authentication value is generated based on the measured tilt angle.

The terminal may measure the tilt angle of the terminal when a communication link with the short-range communication reader is established.

The short-range communication reader may generate the authentication value based on the tilt angle, separately receives from a user or the terminal, additional authentication data, and may authenticate the terminal based on the generated authentication value and the additional authentication data.

The authentication value may be generated by combining at least two tilt angles that are obtained when the terminal repeatedly approaches the short-range communication reader.

According to yet another aspect, there is provided a terminal which communicates using a short-range communication. The terminal includes a short-range communication module configured for establishing a communication link and for communicating via the established link with a short-range communication reader; a sensor configured for measuring a tilt angle of the terminal when the communication link is established; and a short-range communication tag configured for storing the tilt angle and terminal identification data.

The terminal may further have a controller configured for dividing 360° into a plurality of ranges and configured for determining a range to which the tilt angle corresponds.

The terminal may transmit at least one of the tilt angle and an authentication value that is generated based on the tilt angle to the short-range communication reader, and the controller may generate the authentication value based on a value assigned to the determined range.

The short-range communication tag may update the stored tilt angle if a request for providing data from the short-range communication reader is received.

The terminal may further have a camera configured for capturing an image of an identifier on the short-range communication reader when the terminal approaches the short-range communication reader.

According to yet another aspect, there is provided a method of authenticating a terminal by using short-range communication. The method including: setting an authentication value of the terminal corresponding to a tilt angle of the terminal to register the tilt angle; and authenticating the terminal based on the tilt angle when the terminal approaches a short-range communication reader.

The registering may include measuring the tilt angle by the terminal; generating the authentication value for the terminal based on the measured tilt angle and terminal identification data; and storing the authentication value and the terminal identification data.

The registering may further include transmitting the authentication value and the terminal identification data to an authentication server; and registering the authentication value and the terminal identification data in a database, wherein the authentication server executes the registering.

The authenticating may include establishing a communication link with the terminal that approaches the short-range communication reader; receiving the tilt angle measured by the terminal and terminal identification data; determining the authentication value for the terminal based on the measured tilt angle and the terminal identification data; and authenticating the terminal based on the determined authentication value and the terminal identification data.

The authenticating may include authenticating the terminal based on the authentication value and additional authentication data provided by the terminal or a user.

The authenticating may further include: transmitting the authentication value and the terminal identification data to an authentication server; and authenticating, in the authentication server, the terminal based on the authentication value and the terminal identification data to transmit an authentication result to the short-range communication reader.

The tilt angle is an angle of tilt by the terminal tilt by with respect to the short-range communication reader measured by a sensor of the terminal.

The tilt angle may be measured by: capturing by the terminal an image of an identifier on the short-range communication reader; and calculating a tilted angle of the terminal based on the captured image of the identifier.

The registering may include: receiving one or more tilt angles measured by the terminal; generating the authentication value for the terminal based on the one or more received tilt angles and the terminal identification data; and storing the authentication value and the terminal identification data.

The registering may further include: transmitting the authentication value and the terminal identification data to an authentication server; and registering, in the authentication server, the authentication value and the terminal identification data.

The authenticating may include receiving one or more tilt angles that are repeatedly measured by the terminal and the terminal identification data from the terminal via short-range communication; determining the authentication value for the terminal based on the one or more received tilt angles and the terminal identification data; and authenticating the terminal based on the determined authentication value and the terminal identification data.

BRIEF DESCRIPTION OF THE DRAWINGS

FIG. 8 is a view illustrating a method of measuring an angle of a terminal according to another exemplary embodiment.

DETAILED DESCRIPTION OF EXEMPLARY EMBODIMENTS

Since there can be a variety of modifications, changes, and embodiments, certain embodiments will be illustrated and described with reference to the accompanying drawings. This, however, is by no means restricts an inventive concept to certain embodiments, and shall be construed as including all modifications, changes, equivalents, and substitutes covered by the ideas and scope of an inventive concept as will be apparent to one of ordinary skill in the art. The following detailed description is provided to assist the reader in gaining a comprehensive understanding of the methods, apparatuses, and/or systems described herein.

Throughout the description, when describing a certain technology is determined to evade the point of an exemplary embodiment, the pertinent detailed description will be omitted. Also, terms such as "first" and "second" can be used in describing various elements to distinguish one element from the other.

Also, in this specification, when mentioning that one element is "connected" or "coupled" to another element, it is possible for one element to be directly connected or coupled to another element, but if there is no description to the contrary, it should be appreciated that it is also possible to be connected or coupled via medium or the other element.

Throughout the drawings and the detailed descriptions, unless otherwise described, the analogous alphanumeric references will be understood to refer to analogous elements, features, and structures. The relative size and depiction of these elements may be exaggerated for clarity, illustration, and convenience.

Hereinafter, a terminal according to an exemplary embodiment will be described in detail with reference to the accompanying drawings.

Figure 1:
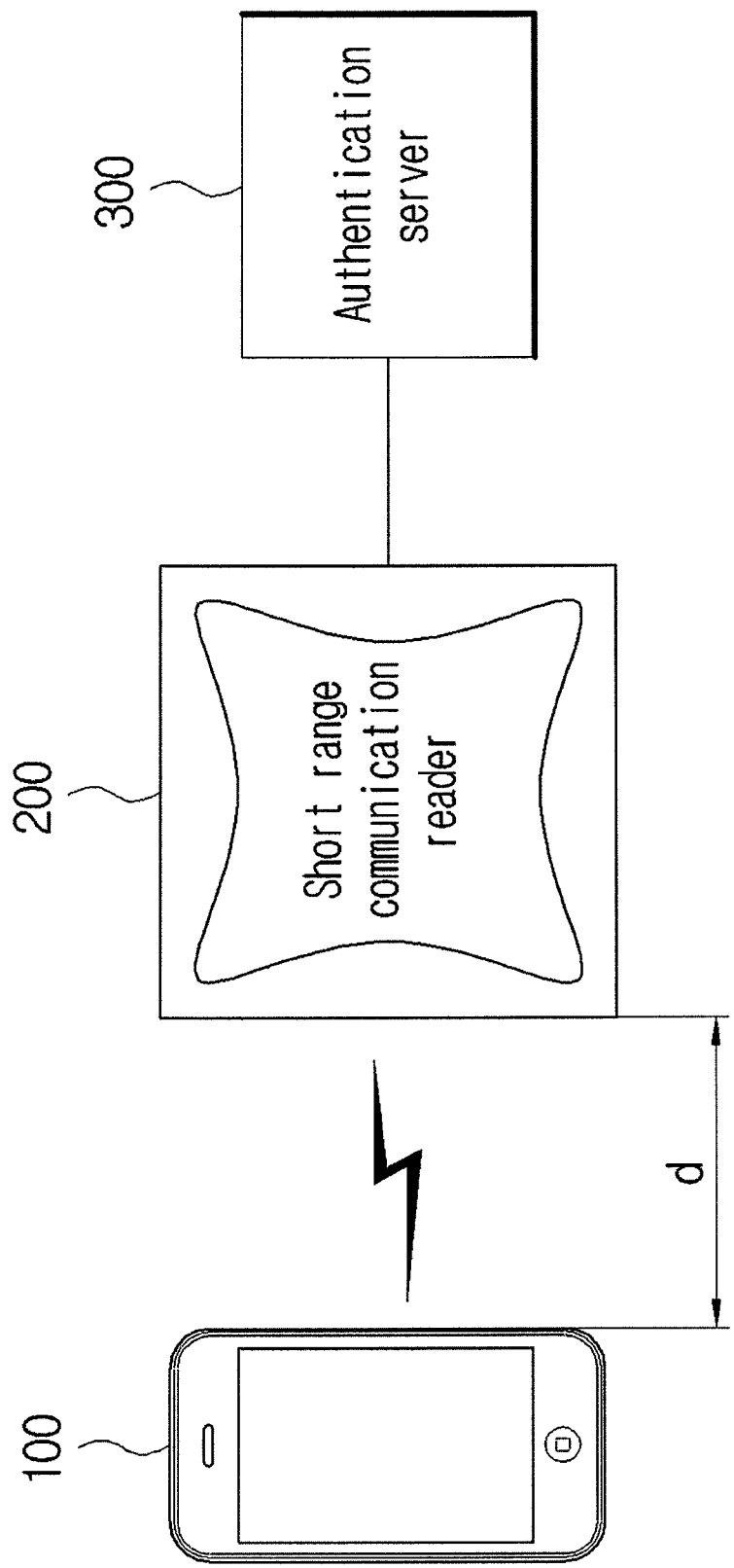
FIG. 1 is a view illustrating an authentication service according to an exemplary embodiment.

FIG. 1 is a view illustrating an authentication service according to an exemplary embodiment.

As shown in FIG. 1, the authentication service providing system comprises a terminal 100 having a short-range communication function and a short range communication reader 200. In addition, the authentication service providing system can further comprise an authentication server 300 for authenticating the terminal 100.

The short-range communication used in the authentication service providing system can include Near Field Communication (NFC), or other similarly-functioning communication such as Bluetooth, Radio Frequency Identification (RFID), and infrared communication.

NFC is an extension of the ISO/IEC 14443 proximity-card standard (contactless card or RFID) and can support a smart card and a reader simultaneously. Also, since NFC is the extension of the ISO/IEEE 14443 standard, it can communicate with the reader or the smart card complying with the ISO/IEEE 14443 standard as well as a protocol to use for communication between NFC devices. NFC was initially developed for use in a terminal.

Presently, NFC is mainly used by a terminal, and can operate in three modes of card emulation, reader/writer emulation, and inter-device communication (peer-to-peer communication). In the card emulation mode, NFC operates in the same way as the conventional RFID card. Accordingly, the user can approach the terminal instead of providing the conventional card to the RFID reader. The current specifications of the contactless smart card have a frequency of 13.56 MHZ, a range of 10 cm or less and a communication speed of 106 kbps or more, and its application may have a payment or a toll collection. In the reader/writer emulation mode, the NFC device can operate as a card reader. The NFC device can read data from another NFC device or a smart card.

In the inter-device communication mode, two NFC devices can communicate bi-directionally with each other (peer-to-peer; P2P). In the inter-device communication mode, the NFC devices can communicate data at the maximum of 424 kbps. The user can place the terminal near a printer to transmit a picture data, or near a display device to display a picture. It is possible to transmit data regardless of the type of data (i.e., text, video, sound, etc.). In the inter-device communication mode, which is different from server/client communication, the NFC devices located within 10 cm from each other can communicate data at the maximum of 424 kbps in the P2P method.

The authentication service providing system authenticates the terminal 100 by carrying out the short-range communication when the terminal 100 approaches the short-range communication reader 200 within a communicable distance d. When the terminal 100 approaches to the short-range communication reader 200 at a preset terminal approaching angle, the terminal 100 can provide an accurate authentication value to the short-range communication reader 200.

The authentication service providing system can determine the authentication value based on the approaching angle of the terminal 100, and can authenticate the terminal 100 by simultaneously or successively performing the method of determining the authentication value based on the approaching angle of the terminal and using an authentication method such as an authentication card or authentication number. The detailed description of an authentication method using an authentication card or number will be omitted.

The terminal 100 is provided with a short-range communication module, and communicates with the short-range communication reader 200 within the communicable distance d in a contactless communication fashion.

Specifically, when the terminal 100 approaches the short-range communication reader 200 to perform communication, the terminal 100 can provide to the communication reader 200 its position i.e., it may provide the approaching angle that is divided according to each tilted angle, to the short-range communication reader 200.

The tilted angle of the terminal 100 can be measured by sensors or camera equipped in the terminal 100. The short-range communication reader 200 may have an identifier on its surface, which may be used as a mark for measuring the tilted angle of the terminal 100.

Figure 6:
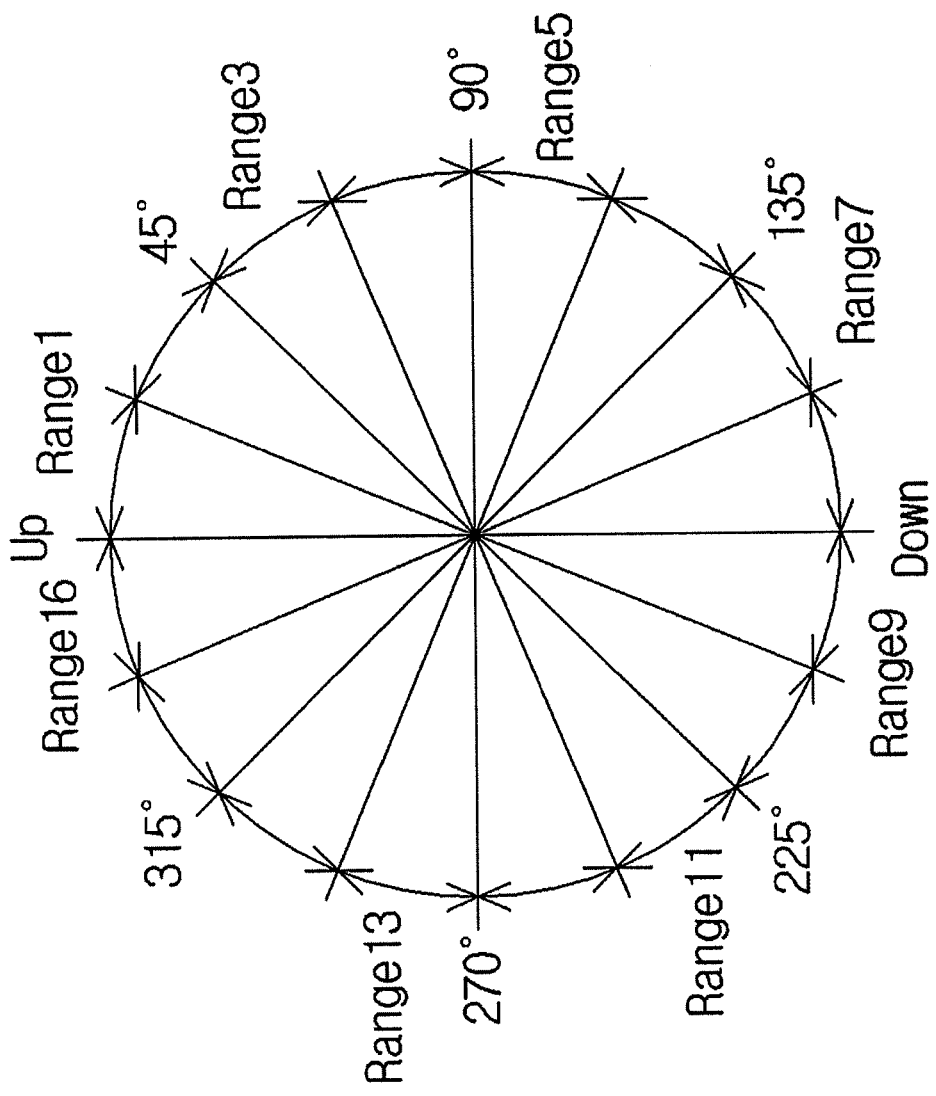
FIG. 6 is a view illustrating a procedure of registering and using an approaching angle of a terminal according to an exemplary embodiment.

In addition, it is possible to set terminal angle data by determining which one of predetermined ranges corresponds to the tilted angle of the terminal 100 that is approaching the short-range communication reader 200. For example, in FIG. 6, 360° may be divided into 16 ranges. In this example, each range has 22.5° range. It is also possible to divide the ranges more narrowly. As yet another exemplary embodiment, the range may be larger than 22.5° range.

In addition, it is possible to generate the terminal angle data in three-dimensional values. This 3-D value is a measurement of the approaching angle between the short-range communication reader 200 and the terminal 100. For example, it is possible to measure the approaching angle by combining the tilted angle of the terminal 100 from the short-range communication reader 200 and the tilted angle of the terminal 100 from the ground.

Figure 7:
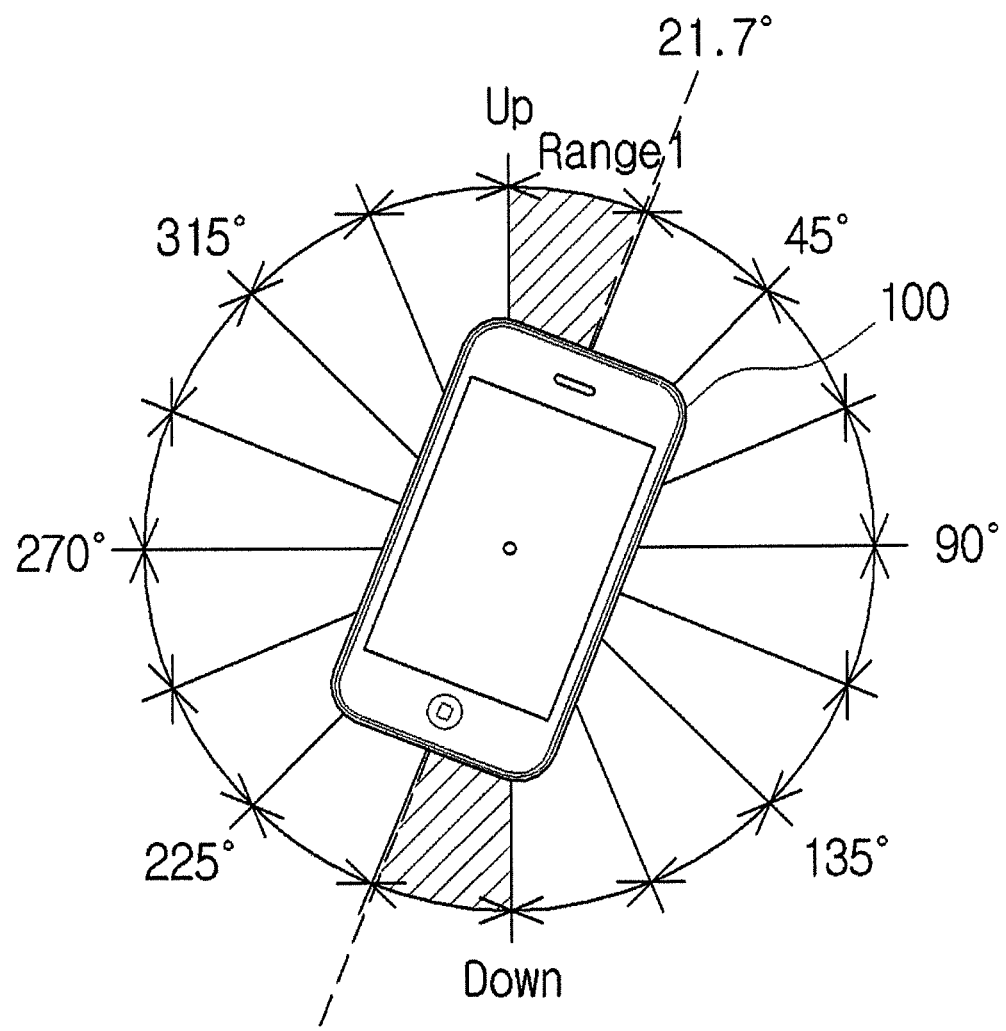
FIG. 7 is a view illustrating a procedure of registering and using an approaching angle of a terminal according to another exemplary embodiment.

In FIG. 7, as the approaching angle that is measured when the terminal 100 approaches the short-range communication reader 200 is 21.7 degrees, the approaching angle of the terminal 100 has a value (for example, "1") corresponding to "range 1." The terminal 100 transmits the obtained approaching angle to the short-range communication reader 200, which can then generate an authentication value based on the received approaching angle. If the approaching angle that is measured when the terminal 100 re-approaches the short-range communication reader 200 is 23.5 degrees, then the approaching angle of the terminal 100 has a value (for example, "2") corresponding to "range 2." If the approaching angle that is measured when the terminal 100 approaches the short-range communication reader 200 again is 46 degrees, then the approaching angle of the terminal 100 has a value (for example, "3") corresponding to "range 3." When receiving a series of approaching angles, the short-range communication reader 200 may generate one authentication value based on the series of approaching angles.

Alternatively, the short-range communication reader 200 may generate one authentication value based on a difference between values for two approaching angles. For example, the short-range communication reader 200 may generate one authentication value based on the first difference between the value for "range 1" and the value for "range 2" and the second difference between the value for "range 2" and the value for "range 3."

The detailed configuration of a terminal 100 according to an exemplary embodiment will be described later with reference to FIG. 2.

The short-range communication reader 200 can perform short-range communication with the terminal 100, and can read data stored in a tag of the terminal 100 to perform an authentication process.

More particularly, the short-range communication reader 200 can establish a channel for communication with the terminal 100 by the short-range communication and receive the approaching angle and terminal identification data from the terminal 100.

In addition, the short-range communication reader 200 can generate the authentication value based on the received approaching angle and terminal identification data and transmit the authentication value to the authentication server 300 (shown in FIG. 1) to request the authentication process. The short-range communication reader 200 can be configured to encrypt and process data transmitted to the authentication server 300 and data received from the authentication server 300.

The short-range communication reader 200 can be configured to freely switch between a register mode and an authentication mode using an operation of a user or a program. The user or a program may operate the short-range communication reader 200 in the register mode in order to pre-register authentication data of the terminal 100.

The authentication value can also be generated by the terminal 100 instead of being generated by the short-range communication reader 200. In such a case, the terminal 100 can generate the authentication value based on the measured approaching angle and transmit the authentication value, instead of the approaching angle, to the short-range communication reader 200.

In the authentication service 300 according to an exemplary embodiment, it is possible that the authentication value is determined by successively combining more than one of the terminal angle data indicative of the angle between the terminal 100 and the short-range communication reader 200. In such a case, the short-range communication reader 200 can receive consecutively more than one approaching angle from the terminal 100 at predetermined time intervals. More than one approaching angle received can be combined to one authentication value in the short-range communication reader 200.

In another exemplary embodiment, an authentication of the terminal 100 can be performed by the short-range communication reader 200 without involvement of the authentication server 300. In this exemplary embodiment, the short-range communication reader 200 can generate the authentication value based on the received approaching angle and terminal identification data and perform the authentication of the terminal 100 based on the generated authentication value.

In yet another exemplary embodiment, authentication of the terminal 100 can be made by simultaneously or successively performing the authentication method using the position information of the terminal in addition an authentication process described in a related art section. In an exemplary embodiment, the terminal 100 can provide the approaching angle and terminal identification data together with authentication data to the short-range communication reader 200, in which the authentication data can be a password or authentication card data stored in the terminal 100. The authentication data can be provided to the short-range communication reader 200 via short-range communication from the terminal e.g., the password is pre-stored in the terminal or input by the user, or the user can input the authentication data manually through a keypad or a touch screen provided on the short-range communication reader 200.

The authentication server 300 performs the authentication process based on a request for authentication of the terminal 100 received from the short-range communication reader 200. The authentication server 300 provides an authentication result to the short-range communication reader 200.

More particularly, the authentication server 300 can perform the authentication process for the terminal 100 based on the authentication value and terminal identification data received from the short-range communication reader 200. The authentication server 300 can maintain the authentication value and terminal identification data for the terminal 100 that the short-range communication reader 200 provided in advance.

Hereinafter, a detailed configuration of the terminal 100 having the short-range communication function according to an exemplary embodiment will be described.

Figure 2:
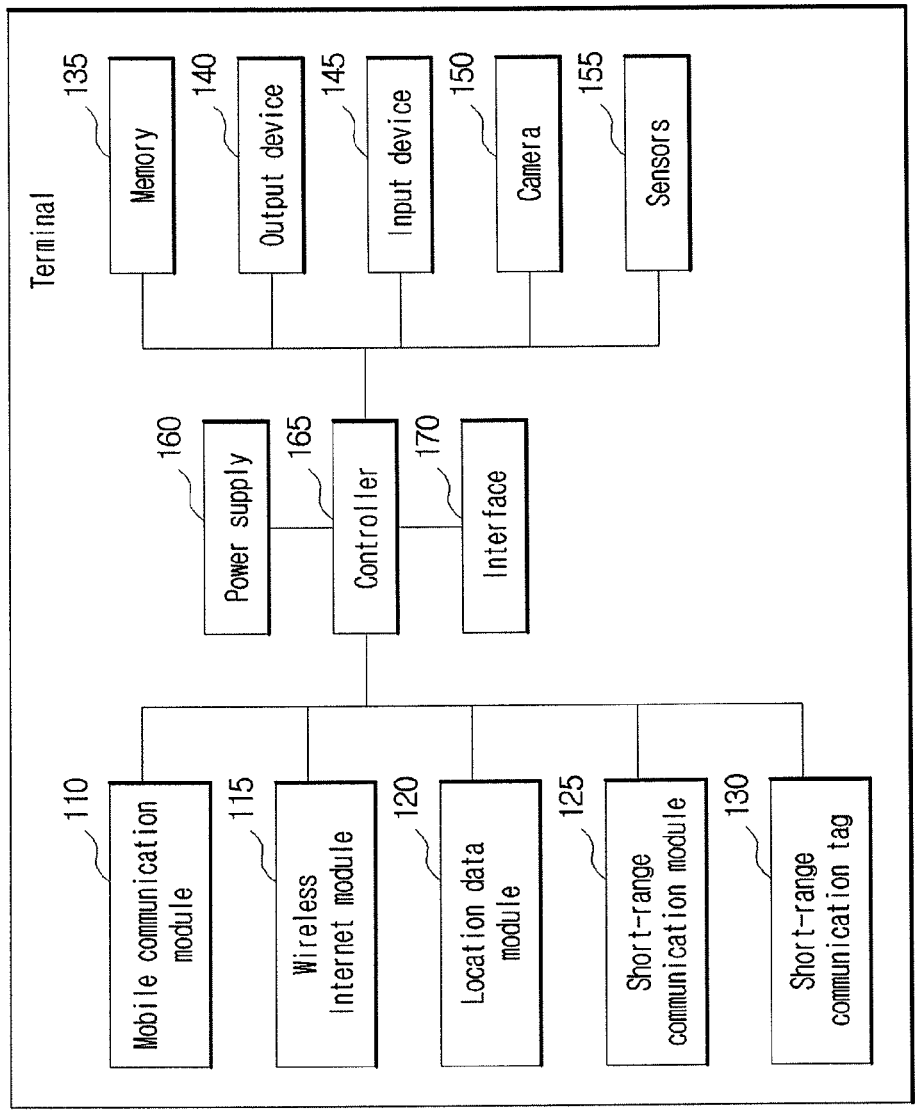
FIG. 2 is a block diagram illustrating a terminal according to an exemplary embodiment.

FIG. 2 is a block diagram illustrating a terminal according to an exemplary embodiment.

As shown in FIG. 2, the terminal 100 can comprise a mobile communication module 110, a wireless Internet module 115, a location data module 120, a short-range communication module 125, a short-range communication tag 130, a memory 135, an output device 140, an input device 145, a camera 150, sensors 155, a power supply 160, a controller 165, and an interface 170.

The mobile communication module 110 performs mobile communication between the terminal 100 and a mobile communication system. More particularly, the mobile communication module 110 communicates a wireless signal with at least one of a BSC (Base Station Controller) or RNC (Radio Network Controller), an external terminal and a server via a mobile communication network. The wireless signal can be one of a voice call signal, a video call signal and various types of data calls such as text or multimedia message.

The wireless Internet module 115 provides the terminal with wireless Internet access. The wireless Internet module 115 can be embedded within or externally coupled to the terminal 100. It is possible to use existing communication technology such as WLAN (Wireless LAN, Wi-Fi), Wibro (Wireless broadband), Wimax (World Interoperability for Microwave Access), and HSDPA (High Speed Downlink Packet Access) as a way to obtain wireless access to the Internet.

The location data module 120 is for determining or obtaining a location of the terminal 100. The GPS (Global Position System) can be an example of the location data module 120. The location data module 120 processes distance data from at least three satellites to one point and time data at which the distance data is measured and applies trigonometry to the processed data to calculate a three-dimensional location data according to latitude, longitude and altitude for the one point at one time.

In addition, the location data module 120 can calculate the location and time data using the three satellites and compensate errors in the calculated location and time data using another satellite. Also, the location data module 120 can also calculate the current location in real time to calculate the speed data.

The short-range communication module 125 is configured for a short-range communication. NFC is a representative example of short-range communication, and Bluetooth, RFID (Radio Frequency Identification), infrared communication (IrDA, infrared Data Association), UWB (Ultra Wideband) and ZigBee can be also used. One exemplary embodiment can be implemented with the NFC technology.

The short-range communication module 125 can establish a communication link with a short-range communication module provided in the short-range communication reader 200 or another terminal. Here, the distance by which the communication link is established can be, in the case of NFC, within about 10~20 cm.

The short-range communication module 125 can read data from the short-range communication tag in another terminal via the established link.

The short-range communication tag 130 can comprise an antenna and an integrated circuit, and can store data in the integrated circuit and transmit data to a short-range communication reader via the antenna. The short-range communication tag and the short-range communication reader can communicate data to each other using an electromagnetic wave.

The short-range communication tag 130 can store the measured angle of the approaching terminal and terminal identification data, which can then be provided to the short-range communication reader 200.

In addition, in case a request for transmitting the angle is received, the short-range communication tag 130 checks the validity of stored data and requests the controller 165 for the angle if the data is outdated. That is, in an exemplary embodiment, when the request for transmitting the angle is received from the short-range communication reader 200, the short-range communication tag 130 provides the pertinent data to the short-range communication reader 200 if a difference between the time when the data is stored and the current time is smaller than a predetermined duration. However, if the difference between the time when the data is stored and the current time is greater than the predetermined duration, the short-range communication tag 130 requests the controller 165 to provide the angle to the short-range communication tag 130, which then provides the angle to the short-range communication reader 200.

The memory 135 can store a program for operation of the controller 165 and input/output data (i.e., phonebook messages, still images, video, etc.). In addition, the memory 135 can store data for various patterns of vibrations and sounds that are output when there is a touch input on a touch screen.

The memory 135 can also be in the form of storage medium, such as a flash memory, a multimedia card micro type memory, a card type memory (i.e., an SD or XD memory), a hard disk drive, RAM (Random Access Memory), SRAM (Static Random Access Memory), ROM (Read-Only Memory), EEPROM (Electrically Erasable Programmable Read-Only Memory), PROM (Programmable Read-Only Memory), a magnetic memory, a magnetic disk and an optical disk.

The output device 140 can produce visual, acoustic or tactile outputs, and can include a display, a sound output device or a haptic device.

The display displays information that is processed in the terminal 100. For example, when the user terminal is in a voice call mode, a UI (User Interface) or GUI (Graphic User Interface) associated with the call mode is displayed. When the terminal 100 is in a video call mode or a camera mode, a recorded video and/or received video, or a corresponding UI or GUI can be displayed.

The display can be realized with a flat panel display, such as an LCD (Liquid Crystal Display), a TFT-LCD (Thin Film Transistor-Liquid Crystal Display), an OLED (Organic Light-Emitting Diode) and a flexible display, or a 3D display. In addition, based on how the terminal is implemented, the terminal 100 can have more than one display. For example, at least two displays can be arranged to be separated or integrated on a same face of the terminal 100, or can be arranged respectively on different faces.

The sound output device can reproduce audio data received from the mobile communication module 110 or stored in the memory 135 in various modes, such as a call receiving mode, a voice call mode or a recording mode, a voice recognition mode, and a television mode.

In addition, the sound output device can output sound effects relating to various functions (i.e., a call reception sound, a message reception alarm) being performed in the terminal 100. The sound output device can include a receiver, a speaker, a buzzer and the like.

The haptic device can produce various tactile effects that the user feels. A representative tactile effect that is produced by the haptic device is a vibration. The haptic device can control the intensity and pattern of the produced vibration. For example, the haptic device can combine different vibrations or output them successively.

The input device 145 is a user interface for receiving various commands from the user, and there is no restriction on how the input device is implemented. For example, the input device 145 can be implemented with more than one component, such as a key pad, a touch pad (pressure/capacitive type), a wheel key and a jog switch.

Also, since it is common for today's terminals 100 to adopt a touch screen, the input device 145 in an exemplary embodiment can be integrated with the output device 140 to implement soft keys on an entire screen of the display.

The camera 150 processes image frames of a still image or a moving image obtained by an image sensor in the video call mode or the camera mode. The processed image frames can be presented on the output device 140.

The image frames processed by the camera 150 can be either stored in the memory 135 or transmitted externally via any one of the mobile communication module 110, the wireless Internet module 115, and the short-range communication module 125. Also, there can be more than one camera 150, depending on the configuration of the terminal 100.

In addition, the camera 150 can take an image of the identifier such as graduations or lamp on the short-range communication reader 200 and the taken image can be utilized by the controller 165 as basic data for calculating the angle of the approaching terminal 100.

For example, in FIG. 8, an identification graduation 210 for showing directions can be located on a front surface of the short-range communication reader 200, and an identification lamp 220, such as a diode, for showing a certain direction can also be located. When the communication link is established with the approaching terminal 100 to the short-range communication reader 200, the controller 165 can analyze the image taken by the camera 150 to calculate the tilted angle of the terminal 100 at the time of taking the picture and determine the authentication value based on the tilted angle.

The sensors 155 sense a current status of the terminal 100, such as an open/close state of the terminal 100, the location of the terminal 100, touch input from the user, an orientation of the user terminal, and acceleration/deceleration of the user terminal, to generate a sensing signal for controlling the operation of the terminal 100. For example, in case that the terminal 100 is a sliding-type phone, the open/close state of the phone can be sensed. In addition, the sensors 155 can perform various sensing functions such as sensing the power provided by the power supply 160 and sensing the connection with an external device via the interface 170.

The sensors 155 detect the shaking of the terminal 100 and notify the detection to the controller 165. In addition, the sensors 155 can measure the tilt angle of the terminal 100, and provide the controller 165 with the measurement data. For example, if the terminal 100 is provided with a gyro sensor, it is possible to measure the level of tilting of the terminal 100 by aid of the gyro sensor and convert the level of tilting to a numerical value e.g., preset range. In addition, it is also possible to use at least one of an acceleration sensor, the gravity sensor, and a compass sensor, instead of the gyro sensor.

The sensors 155 can measure the approaching angle of the terminal 100 when the communication link is established between the short-range communication reader 200 and the terminal 100. Moreover, the sensors 155 can start measuring the approaching angle when instructed by the controller 165.

The power supply 160 can be powered from an external power source or an internal power source under the control of the controller 165, and can provide the power required for operation of each component.

The controller 165 generally controls the overall operations of the terminal. For example, the controller 165 controls or processes a voice call, data call or video call. Also, the controller 165 can be provided with a multimedia module for playing back multimedia data.

In addition, the controller 165 can perform calculations using the measurement data that is provided by the sensors 155, and can determine the angle of the approaching terminal based on the calculation.

In addition, the controller can analyze an image frame that is provided by the camera 150 to calculate the tilted angle of the terminal 100 and can determine the angle of the approaching terminal based on this calculation.

The interface 170 is for connecting the terminal 100 to any external devices. The interface 170 receives data or power from the external device and delivers the data or power to each component in the terminal 100, or transmits data from the terminal 100 to the external device. For example, the interface 170 can include at least one of a cord/cordless headset port, an external recharger port, a cord/cordless data port, a memory card port, a port for connecting a device having an identification module, an audio I/O (input/output) port, a video I/O port, an earphone port and the like.

Hereinafter, the method of providing the authentication service to the terminal will be described with reference to the drawings.

Figure 3:
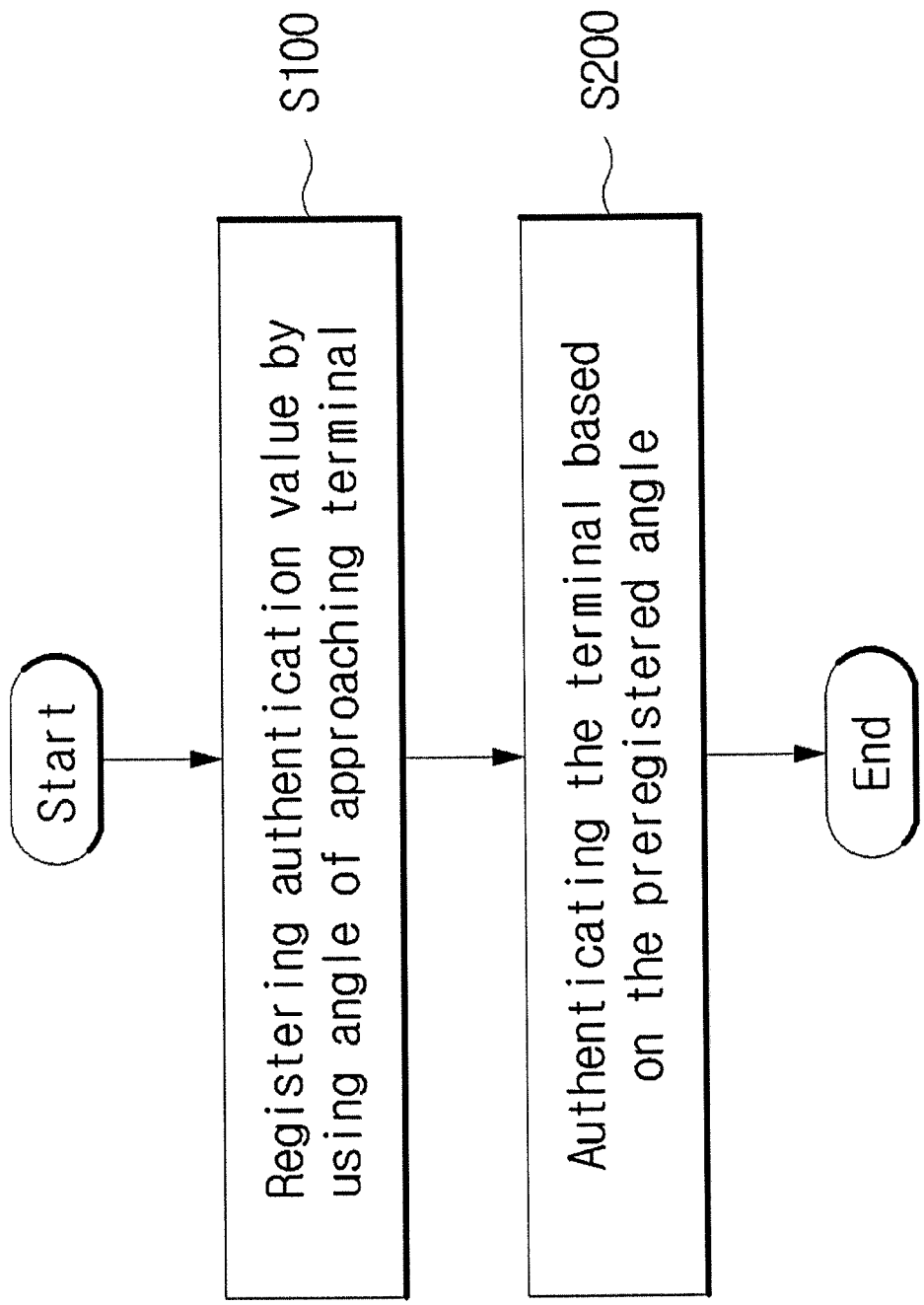
FIG. 3 is a flowchart illustrating a method executed by an authentication service according to an exemplary embodiment.

FIG. 3 is a flowchart illustrating a method executed by the authentication service according to an exemplary embodiment.

As shown in FIG. 3, in order to provide the authentication service, the authentication value and the terminal identification data needs to be pre-registered in the authentication server 300 by using the short-range communication reader 200 (operation S100). In order to generate the authentication value of the terminal 100, the angle of the approaching terminal 100 is measured by the terminal 100 and the measured angle is then used as a key value.

In addition, it is also possible to generate the authentication value of the terminal 100 by using one or more angles of the approaching terminal 100. In this case, the one or more angles can be obtained by repeatedly reading the angles of the terminal 100 as it approaches the short-range communication reader 200. Also, it is possible to generate one or more authentication values corresponding to each of the angles and perform the authentication process for the terminal 100 based on the generated one or more authentication values.

The terminal 100 that completed the registration can request authentication with the short-range communication reader 200 based on the registered angle (in operation S200).

Hereinafter, an exemplary method of registering authentication data and an exemplary method of authentication will be described in detail according to an exemplary embodiment.

Figure 4:
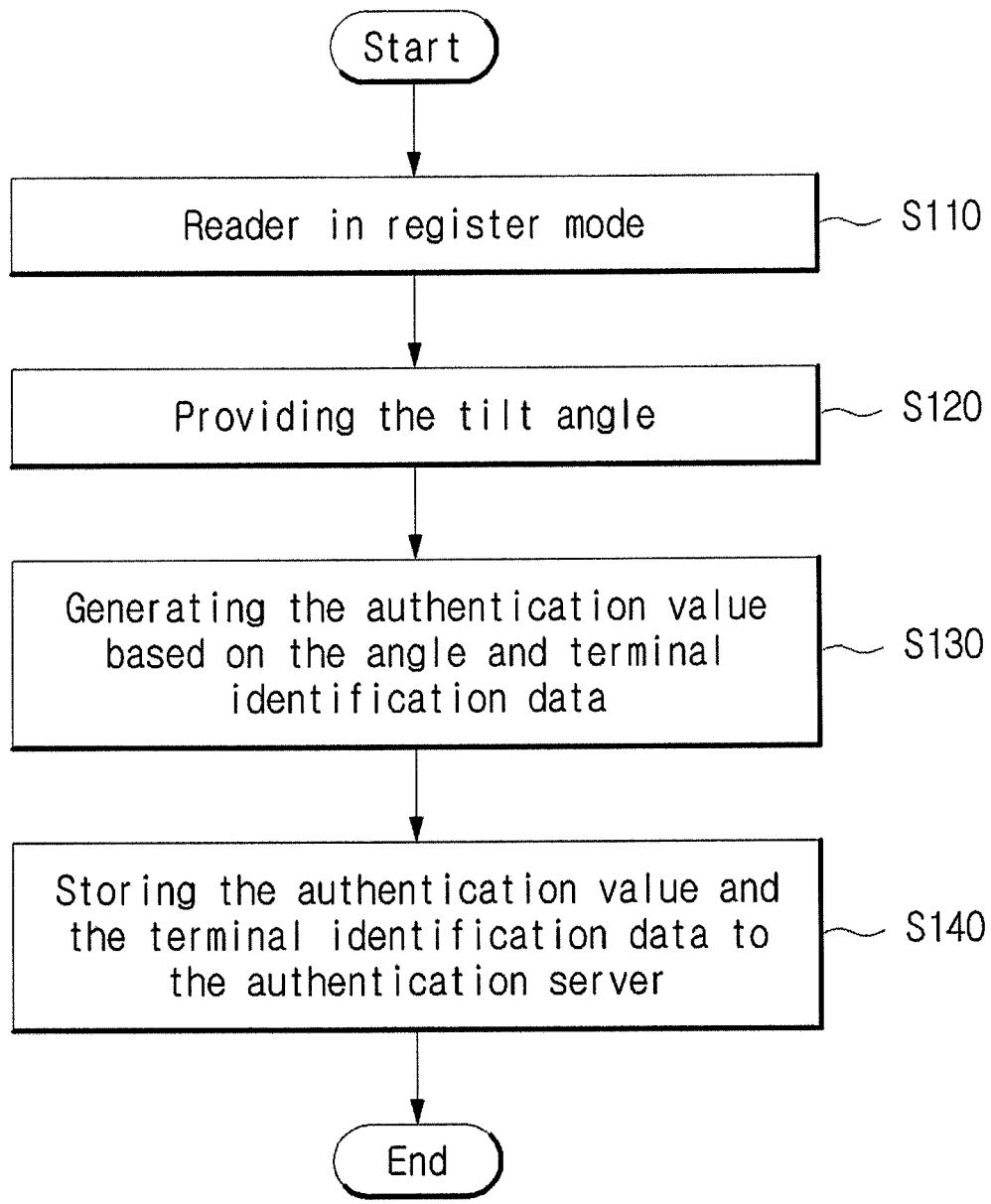
FIG. 4 is a flowchart illustrating a method of registering an authentication value of a terminal according to an exemplary embodiment.

FIG. 4 is a flowchart illustrating a method of registering the authentication value of the terminal according to an exemplary embodiment.

The short-range communication reader 200 is operated in the register mode to initiate the process of registering authentication data of the terminal 100 with the short-range communication reader 200 (in operation S110).

Then, as the terminal 100 is approaching the short-range communication reader 200, it provides the tilt angle and its identification data (in operation S120). The terminal identification data can have a unique identification number for distinguishing the terminal 100 from other terminals. In addition, it is possible to measure the angle of tilt of the terminal 100 by using the sensors 155 or the camera 150 of the terminal 100.

The short-range communication reader 200 can send an instruction to the terminal 100 to continue approaching the short-range communication reader 200 at a particular angle. Then, if the terminal 100 is at the instructed angle, the short-range communication reader 200 checks whether the angle received from the terminal 100 corresponds with the instructed angle. If these angles match with each other, the angle can be used as basic data for generating the authentication value. Otherwise, the short-range communication reader 200 can send the instruction to the terminal 100 to re-approach at the specific angle e.g., to repeatedly approach the short-range communication reader 200 at different instructed angles.

The short-range communication reader 200 can request one or more angles in order to generate the authentication value. That is, the short-range communication reader 200 can instruct the terminal 100 to successively approach the short-range communication reader 200 at certain time intervals.

Then, the short-range communication reader 200 generates the authentication value for the terminal 100 based on the obtained angle and the terminal identification data (in operation S130). That is, the short-range communication reader 200 can generate the authentication value by combining one or more of the obtained angles.

Then, the authentication value and the terminal identification data can be transmitted to the authentication server 300, which then can register received data (in operation S140).

Figure 5:
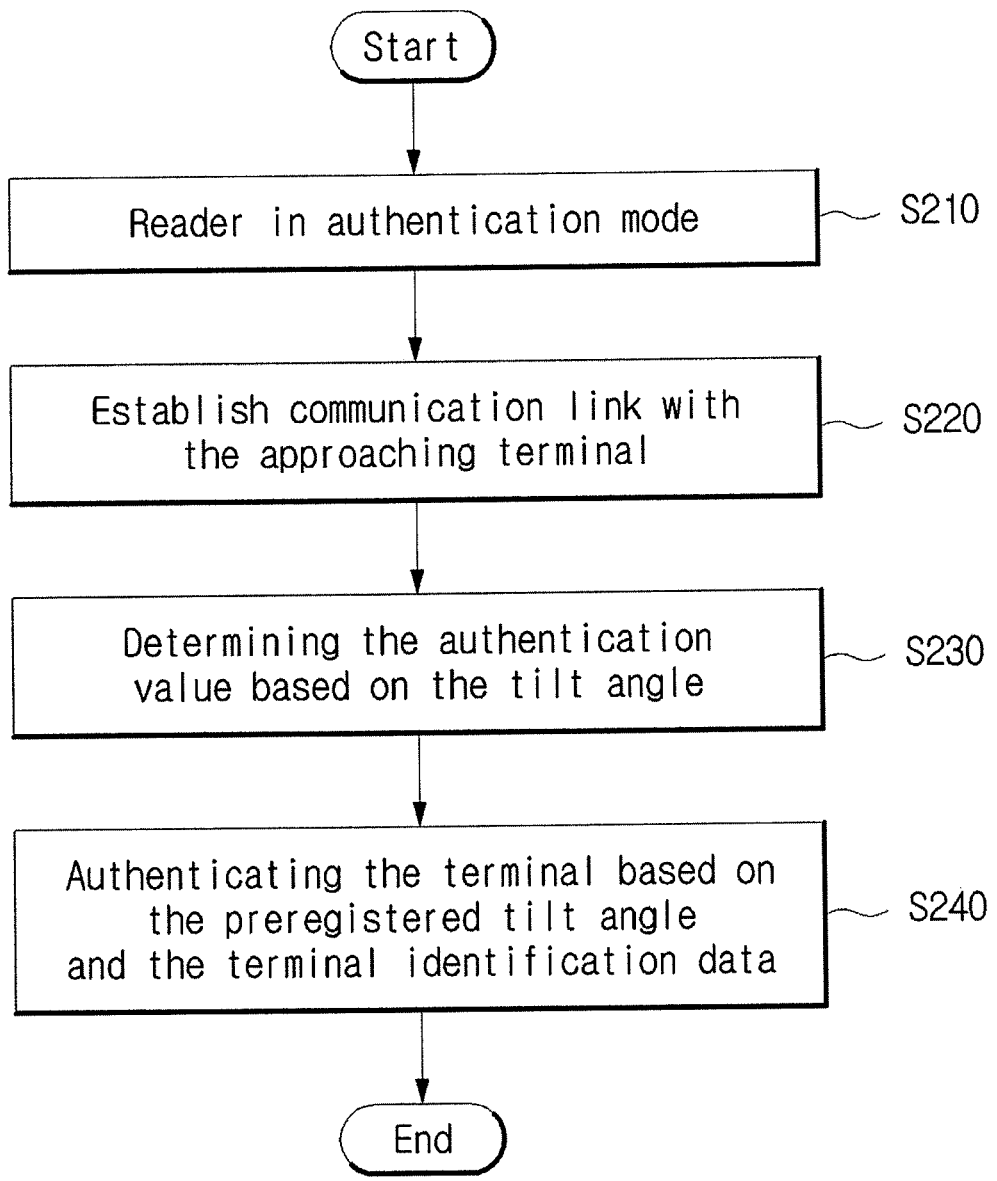
FIG. 5 is a flowchart illustrating a method of authenticating a terminal according to an exemplary embodiment.

FIG. 5 is a flowchart illustrating a method of authenticating the terminal according to an exemplary embodiment.

The short-range communication reader 200 operates in the authentication mode (in operation S210).

Then, the terminal 100 approaches the short-range communication reader 200 at the registered tilt angle. The short-range communication reader 200 can identify the terminal 100 by communicating with the short-range communication tag 130 in the terminal 100. Then, the short-range communication reader 200 can register the identified terminal 100 and check an attribute of the terminal 100. Then, the short-range communication reader 200 can establish the communication link with the terminal 100 (in operation S220).

After establishing the communication link between the short-range communication reader 200 and the terminal 100, the terminal 100 can store the tilt angle that is obtained by using the sensors 155 or the camera 150 in the short-range communication tag 130.

The short-range communication reader 200 can receive the tilt angle and the terminal identification data from the short-range communication tag 130. The short-range communication reader 200 generates/determines the authentication value for the terminal 100 based on the tilt angle and the terminal identification data (in operation S230).

The short-range communication reader 200 can transmit the authentication value and the terminal identification data to the authentication server 300, which can then perform the authentication process for the terminal 100 based on the transmitted authentication value and terminal identification data (in operation S240). Then, the authentication server 300 can provide the authentication result to the short-range communication reader 200.

Through these exemplary configurations, the authentication service providing system according to an exemplary embodiment can avoid cumbersome steps, such as inputting a password, and yet still provide the authentication process with an improved security, just by approaching the terminal at the registered angle.

It will be appreciated that exemplary embodiments can be implemented in the form of a processor-executable program that has processor-executable instructions and is contained in a processor-readable medium. The processor-readable medium can be any kind of medium assessable by a processor such as, but not limited to, non-volatile medium, a portable medium, and non-portable medium. Examples of this medium may include compact disk-read only memory (CD ROM), random access memory (RAM), flash memory, optical disks, hard disks, and the like.

The above description has been provided by way of an example only, and it shall be appreciated that it is possible for any ordinarily skilled person in the related art to easily modify exemplary embodiments without departing from the scope of the technical ideas and essential features of the disclosure. Therefore, it shall be appreciated that the exemplary embodiments described above are illustrative only, not restrictive. For instance, any elements described to be combined can also be embodied separately, and likewise, any elements described to be separated can also be combined.

The scope of an inventive concept shall be defined not by the above exemplary description but rather by the claims appended below, and their equivalents, and it shall be understood that all possible changes, or modifications in form and details may be made therein without departing from the spirit and scope of an inventive concept as defined by the appended claims and their equivalents. The exemplary embodiments can be readily applied to other types of apparatuses. The scope is defined not by the detailed description of exemplary embodiments but by the appended claims, and all differences within the scope will be construed as being included in an inventive concept.

What is claimed is:

1. An authentication system of authenticating a terminal, the system comprising:
a short-range communication reader; and
a terminal which measures a tilt angle as the terminal approaches a short-range communication reader; and
wherein the short-range communication reader receives the measured tilt angle and terminal identification data from the terminal by using short-range communication and generates an authentication value based on the tilt angle, wherein the short-range communication reader authenticates the terminal based on the generated authentication value, wherein the terminal measures the tilt angle of the terminal and registers the measured tilt angle for use as the authentication value when a communication link with the short-range communication reader is established, wherein the short-range communication reader generates the authentication value based on the tilt angle, separately receives from a user or the terminal additional authentication data, and authenticates the terminal based on the generated authentication value and the additional authentication data, and wherein the authentication value is generated by combining at least two tilt angles that are obtained consecutively at predetermined time intervals when the terminal approaches the short-range communication reader.

2. The authentication system as stated in claim 1, further comprising an authentication server which receives from the short-range communication reader the tilt angle and the terminal identification data and which authenticates the terminal based on the received tilt angle and the received terminal identification data.

3. The authentication system as stated in claim 1, wherein the terminal measures the tilt angle,
wherein the short-range communication reader generates the authentication value based on the measured tilt angle.

4. A terminal which communicates using a short-range communication, the terminal comprising:
a short-range communication module configured for establishing a communication link and for communicating via the established link with a short-range communication reader;
a sensor configured for measuring a tilt angle of the terminal when the communication link is established; and
a short-range communication tag configured for storing the tilt angle and terminal identification data,
wherein the stored tilt angle is registered for use as an authentication value,
wherein the authentication value is generated by combining at least two tilt angles that are obtained consecutively at predetermined time intervals when the terminal approaches the short-range communication reader.

5. The terminal as stated in claim 4, further comprising a controller configured for dividing 360° into a plurality of ranges and configured for determining a range to which the tilt angle corresponds.

6. The terminal as stated in claim 5, wherein the terminal transmits at least one of the tilt angle and the authentication value that is generated based on the tilt angle to the short-range communication reader, and
wherein the controller generates the authentication value based on a value assigned to the determined range.

7. The terminal as stated in claim 4, wherein the short-range communication tag updates the stored tilt angle if a request to provide data is received from the short-range communication reader.

8. The terminal as stated in claim 4, further comprising:
a camera configured for capturing an image of an identifier on the short-range communication reader when the terminal approaches the short-range communication reader.

9. A method of authenticating a terminal by using short-range communication, comprising:
measuring, when a communication link is established, a tilt angle of the terminal;
setting an authentication value of the terminal corresponding to the measured tilt angle of the terminal to register the tilt angle; and
authenticating the terminal based on the tilt angle when the terminal approaches a short-range communication reader
wherein the setting the authentication value comprises:
receiving, consecutively at predetermined time intervals, at least two tilt angles measured repeatedly by the terminal and terminal identification data from the terminal via the short-range communication;
determining the authentication value for the terminal based on the received at least two tilt angles and the terminal identification data; and
authenticating the terminal based on the determined authentication value and the terminal identification data.

10. The method as stated in claim 9, further comprising:
storing the authentication value and the terminal identification data.

11. The method as stated in claim 10, further comprising:
transmitting the authentication value and the terminal identification data to an authentication server; and
registering the authentication value and the terminal identification data in a database, wherein the authentication server executes the registering.

12. The method as stated in claim 9, wherein the authenticating comprises:
establishing a communication link with the terminal that approaches the short-range communication reader;
receiving the tilt angle measured by the terminal and terminal identification data;
determining the authentication value for the terminal based on the received tilt angle and the terminal identification data; and
authenticating the terminal based on the determined authentication value and the terminal identification data.

13. The method as stated in claim 9, wherein the authenticating comprises authenticating the terminal based on the authentication value and additional authentication data provided by the terminal or a user.

14. The method as stated in claim 12, wherein the authenticating further comprises:
transmitting the authentication value and the terminal identification data to an authentication server;
authenticating, in the authentication server, the terminal based on the authentication value and the terminal identification data; and
transmitting an authentication result to the short-range communication reader.

15. The method as stated in claim 12, wherein the tilt angle is an angle of tilt by the terminal with respect to the short-range communication reader measured by a sensor.

16. The method as stated in claim 12, wherein the measuring of the tilt angle comprises:
capturing by the terminal an image of an identifier on the short-range communication reader; and
calculating the tilt angle based on the captured image.

17. The method as stated in claim 9, further comprising:
transmitting the authentication value and the terminal identification data to an authentication server; and
registering, in the authentication server, the authentication value and the terminal identification data.

18. A method of authenticating a terminal comprising:
   detecting an angle of the terminal with respect to a pre-set coordinate; and
   authenticating the terminal based on the detected angle,
   wherein different authentication values are assigned to different angles of the terminal, and
   wherein the angle is detected as the terminal establishes a communication link with a communication reader, and
   wherein the authenticating comprises:
   receiving, consecutively at predetermined time intervals, at least two tilt angles measured repeatedly by the terminal and terminal identification data from the terminal via the communication reader;
   determining an authentication value for the terminal based on the received at least two tilt angles and the terminal identification data; and
   authenticating the terminal based on the determined authentication value and the terminal identification data.

19. The method of claim 18, wherein the communication reader is a short-range communication reader that establishes the link with the terminal when the terminal is not further than 30 cm from the communication reader.

20. The method of claim 19, wherein the detected angle is a value indicating an amount of tilt of the terminal with respect to the communication reader and wherein the terminal is a portable mobile device.

21. A method of authenticating a terminal comprising:
   detecting an angle of the terminal with respect to a pre-set coordinate; and
   authenticating the terminal based on the detected angle,
   wherein different authentication values are assigned to different angles of the terminal, and
   wherein the angle is detected as the terminal establishes a communication link with a communication reader,
   wherein the detecting the angle comprises:
   detecting three dimensional coordinates indicating the angle of the terminal using at least three satellites; and
   verifying the detected three dimensional coordinates using another satellite.

* * * * *